United States Patent
Nishibe et al.

(10) Patent No.: US 9,200,677 B2
(45) Date of Patent: Dec. 1, 2015

(54) SHAFT COUPLING STRUCTURE

(71) Applicant: SUMITOMO HEAVY INDUSTRIES, LTD., Tokyo (JP)

(72) Inventors: Shinichi Nishibe, Obu (JP); Tetsuzo Ishikawa, Obu (JP); Sakae Mitsufuji, Obu (JP); Yoshitaka Shizu, Obu (JP); Yuichi Nishitani, Obu (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 14 days.

(21) Appl. No.: 14/086,042

(22) Filed: Nov. 21, 2013

(65) Prior Publication Data

US 2014/0154005 A1    Jun. 5, 2014

(30) Foreign Application Priority Data

Dec. 4, 2012 (JP) ................. 2012-265852

(51) Int. Cl.
| | |
|---|---|
| *F16B 2/06* | (2006.01) |
| *F16D 1/08* | (2006.01) |
| *F16D 1/05* | (2006.01) |
| *F16D 1/04* | (2006.01) |

(52) U.S. Cl.
CPC .. *F16D 1/05* (2013.01); *F16D 1/04* (2013.01); *F16B 2/065* (2013.01); *F16D 1/0864* (2013.01); *F16D 1/0876* (2013.01); *Y10T 403/535* (2015.01); *Y10T 403/7021* (2015.01); *Y10T 403/7047* (2015.01)

(58) Field of Classification Search
CPC .............. F16B 2/065; F16B 2/06; F16D 1/08; F16D 1/0852; F16D 1/087; F16D 2001/08; F16D 1/04; F16D 1/0876; F16D 1/0864

USPC .............. 403/109.6, 289, 290, 344, 365, 366, 403/372, 373, 378, 1, 355, 36, 356
See application file for complete search history.

(56) References Cited

U.S. PATENT DOCUMENTS

| | | | | |
|---|---|---|---|---|
| 5,006,007 A | * | 4/1991 | Fischer et al. | 403/290 |
| 5,700,233 A | * | 12/1997 | Fabris | 492/1 |
| 6,604,887 B2 | * | 8/2003 | Carreira | 403/373 |
| 2012/0230758 A1 | * | 9/2012 | Widenmeyer et al. | 403/290 |

FOREIGN PATENT DOCUMENTS

| | | | | |
|---|---|---|---|---|
| DE | 102010052369 | * | 5/2012 | .............. F16D 1/04 |
| JP | 2004-364364 A | | 12/2004 | |
| JP | 2009-257543 A | | 11/2009 | |

* cited by examiner

*Primary Examiner* — Josh Skroupa
(74) *Attorney, Agent, or Firm* — Squire Patton Boggs (US) LLP

(57) ABSTRACT

In a shaft coupling structure in which a second shaft is inserted into a cylindrical portion provided in a first shaft to be coupled with each other, with a bush being interposed between an inner circumference of the first shaft and an outer circumference of the second shaft, the first shaft and the second shaft are coupled with each other by a combination of a key coupling and a clamp coupling; the first shaft has a keyway with which the key engages and a shaft slit which is formed in the cylindrical portion by cutting off a portion thereof in the axial direction; and a fastener for the clamp coupling is mounted on a portion of an outer circumference of the first shaft in which the shaft slit is formed and the bush has a bush slit which corresponds to the keyway.

14 Claims, 5 Drawing Sheets

SHAFT COUPLING STRUCTURE

INCORPORATION BY REFERENCE

Priority is claimed to Japanese Patent Application No. 2012-265852, filed Dec. 4, 2012, the entire content of which is incorporated herein by reference.

BACKGROUND

1. Technical Field

The present invention relates to a shaft coupling structure.

2. Description of the Related Art

The related art discloses a shaft coupling structure where a motor shaft is inserted into a hollow portion provided in an input shaft to be coupled with each other.

In the shaft coupling structure, a keyway is formed in each of the input shaft and the motor shaft and a slit is formed in the input shaft, and the input shaft and the motor shaft are coupled with each other by the combination of a key coupling and a clamp coupling. Power transmission is performed via the key, and the clamp bridges a gap between the key and the keyway, thereby contributing to reduction in vibration and noise.

SUMMARY

According to an embodiment of the present invention, there is provided a shaft coupling structure in which a second shaft is inserted into a cylindrical portion provided in a first shaft to be coupled with each other. With a bush being interposed between an inner circumference of the first shaft and an outer circumference of the second shaft, the first shaft and the second shaft are coupled with each other by a combination of a key coupling and a clamp coupling. The first shaft has a keyway with which the key engages and a shaft slit which is formed in the cylindrical portion by cutting off a portion thereof in the axial direction. A fastener for the clamp coupling is mounted on a portion of an outer circumference of the first shaft in which the shaft slit is formed. The bush has a bush slit which corresponds to the keyway.

DETAILED DESCRIPTION

Since, in the shaft coupling structure described above, for example, an input shaft was required to be prepared for each type of motor shaft, costs were likely to become high.

In certain embodiments of the present invention, it is desirable to provide a shaft coupling structure which can be applied to a coupling between various types of shafts at low costs by the combination of a key coupling and a clamp coupling.

In the embodiment of the present invention, when the second shaft is coupled with the inner circumference of the first shaft, with the bush being interposed between the inner circumference of the first shaft and the outer circumference of the second shaft, the coupling is performed based on the combination of the key coupling and the clamp coupling.

At this time, the first shaft has the keyway and the shaft slit formed in the cylindrical portion by cutting off a portion thereof in the axial direction, and the fastener for the clamp coupling is mounted on a portion of the outer circumference of the first shaft in which the shaft slit is formed. On the other hand, the bush has the bush slit which corresponds to the keyway of the first shaft.

Accordingly, with merits of both of the key coupling and the clamp coupling being enjoyed, a first shaft and a second shaft of various shapes or sizes can be coupled with each other at low costs when a bush, which corresponds to the shafts of various shapes or sizes, is only interposed therebetween.

Hereinafter, an exemplary embodiment of the present invention will be described in detail with reference to the accompanying drawings.

Figure 2:
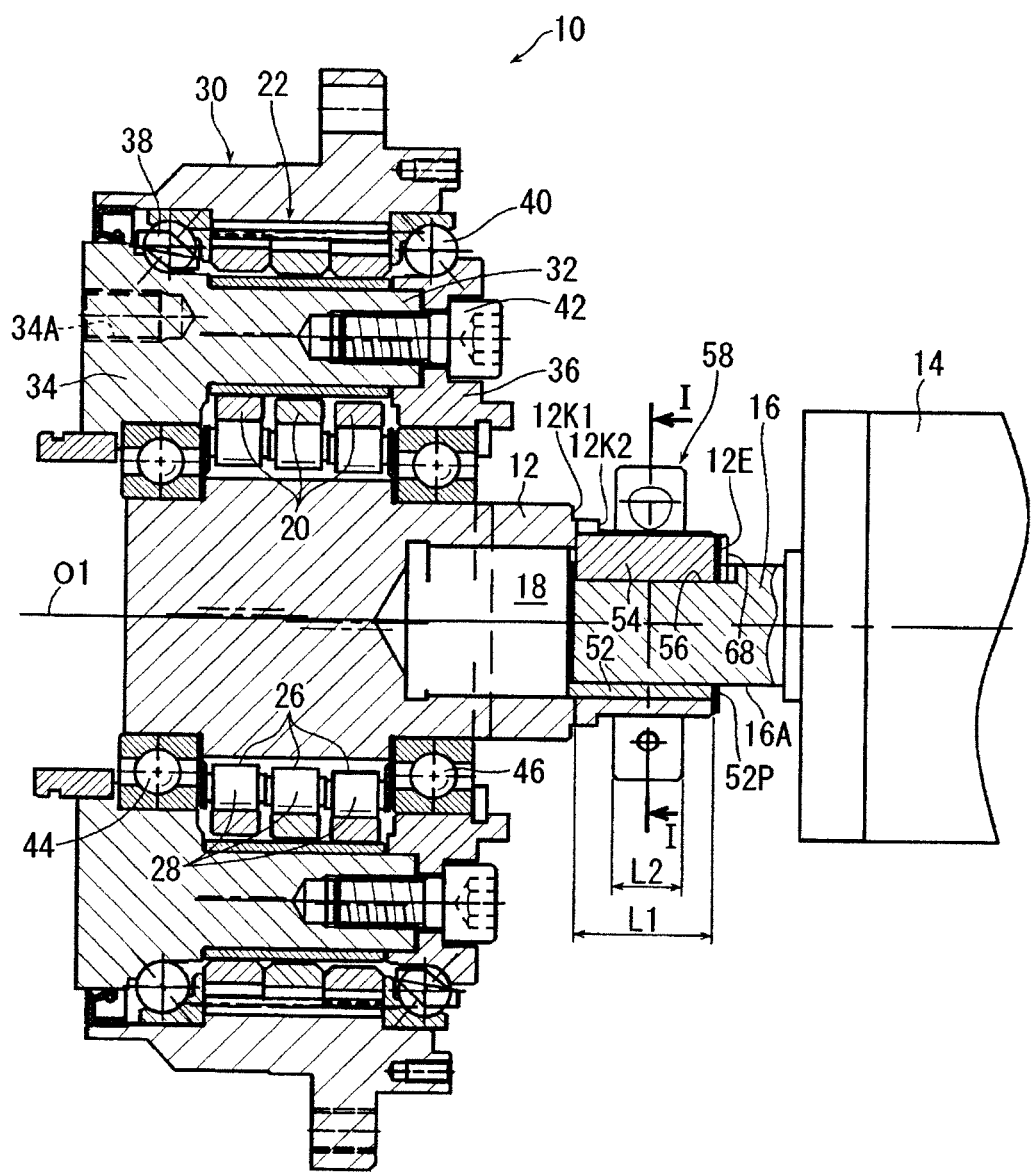
FIG. 2 is a cross-sectional view illustrating an exemplary configuration in which the shaft coupling structure according to the exemplary embodiment of the present invention is applied to a coupling between a motor shaft of a motor and an input shaft of a speed reducer.

FIG. 2 is a cross-sectional view illustrating an exemplary configuration in which a shaft coupling structure according to an exemplary embodiment of the present invention is applied to a coupling between a motor shaft of a motor and an input shaft of a speed reducer.

A coupling structure between an input shaft 12 (a first shaft) of a speed reducer 10 and a motor shaft 16 (a second shaft) of a motor 14 will be described later, and, first, a schematic configuration of the power transmission system of the speed reducer 10 will be briefly described with reference to FIG. 2.

The speed reducer 10 is a speed reducer which is called an eccentric oscillation type and is widely used in the joint drive of a robot and the drive system of a machine tool. The input shaft 12 of the speed reducer 10 is arranged in the position of a shaft center O1 of an internal gear 22. An eccentric body 26 is integrally formed with the input shaft 12. An external gear 20 is assembled onto the outer circumference of the eccentric body 26 via a roller 28. The external gear 20 internally meshes with the internal gear 22. The internal gear 22 is integrated with a casing 30. The external gear 20 has the number of teeth just slightly less (as less as 1 in this example) than the number of teeth of the internal gear 22.

A pin-shaped member 32 passes through each of the external gears 20. On both sides of the external gears 20 in the axial direction, a pair of a first carrier 34 and a second carrier 36 are rotatably supported by the casing 30 via bearings 38 and 40. The first carrier 34 and the second carrier 36 are coupled with each other via the pin-shaped member 32 and a bolt 42. A driven member not illustrated is coupled with the first carrier 34 via a tap hole 34A.

An operation of the power transmission system of the speed reducer 10 will be briefly described.

When the input shaft 12 is rotated, the eccentric body 26 integrated with the input shaft 12 is rotated and the external gear 20 are oscillated via the roller 28. As a result, a phenomenon occurs in which a meshing position of the external gear 20 sequentially shifts with respect to the internal gear 22. Since the number of teeth of the external gear 20 is at least one fewer than the number of teeth of the internal gear 22, the external gear 20 shifts at least one tooth out of phase with respect to the internal gear 22 every time when the input shaft 12 is rotated (makes a rotation). The rotational component is transmitted to the first carrier 34 and the second carrier 36 via the pin-shaped member 32, thereby driving the driven member coupled with the drive member via the first carrier 34 and the tap hole 34A.

Subsequently, with reference to FIGS. 1 to 3B, a coupling structure between the input shaft 12 (the first shaft) of the speed reducer 10 and the motor shaft 16 (the second shaft) of the motor 14 according to the embodiment will be described in detail. The dimensions of gaps and the likes do not necessarily coincide with the actual dimensions thereof such that the embodiment of the present invention can be easily understood.

In the coupling structure, the input shaft 12 and the motor shaft 16 are coupled with each other by inserting the tip of the motor shaft 16 into a hollow portion (cylindrical portion) 18 provided in the input shaft 12. A bush 52 is interposed between an inner circumference 12A of the input shaft 12 and an outer circumference 16A of the motor shaft 16, and the input shaft 12 and the motor shaft 16 are coupled with each other by the combination of a coupling by a key 54 and a clamp coupling by a fastener 58.

The motor shaft 16 of the motor 14 has a keyway 56 formed in the outer circumference 16A thereof along the axial direction. In the embodiment, a general-purpose motor is used as the motor 14, and the motor shaft 16 and the keyway 56 of the general-purpose motor 14 are used as originally configured.

The input shaft 12 of the speed reducer 10 is supported by the first carrier 34 and the second carrier 36 via ball bearings 44 and 46. The input shaft 12 has the hollow portion 18 on a side opposite to a load side in the axial direction (on the motor 14 side). The input shaft 12 has a stepped down portion on the motor 14 side thereof formed from substantially axial center position of the hollow portion 18 via two steps 12K1 and 12K2, and the stepped down portion has a thinner wall thickness than the remainder of the hollow portion 18.

The input shaft 12 has a keyway formed from an end surface 12E on the motor 14 side thereof to an axial position slightly exceeding the steps 12K1 and 12K2, where the key 54 engages with the keyway, and has a clamping shaft slit formed by cutting off a portion of the hollow portion 18 in the axial direction. However, in the embodiment, a single shaft groove 62 serves both as the keyway and the shaft slit (the shaft groove 62, the keyway and the shaft slit indicate the same single portion). That is, in appearance, the input shaft 12 has the only one shaft groove 62 which serves both as the keyway and the shaft slit.

In the specification, for convenience of explanation, the physical "shaft groove 62" is suitably called the keyway when the shaft groove is focused on serving as a keyway and the shaft slit when the shaft groove is focused on serving as a shaft slit.

On the other hand, the bush 52 has a cylindrical shape, a collar 52P and a bush slit 64 formed to pass therethrough in the axial direction, and the bush slit 64 corresponds to the keyway (shaft groove 62) of the input shaft 12. The bush slit 64 is intended to be made in such a manner that the key 54 can go beyond the bush 52 in the radial direction and engage with both of the keyway 56 of the motor shaft 16 and the keyway of the input shaft 12. The collar 52P is pinched between the end surface 12E of the input shaft 12 and a snap ring 68 locked on the motor shaft 16, thereby locating the bush 52 in the axial direction.

The fastener 58 for clamp coupling is mounted on a portion of an outer circumference 12B of the input shaft 12 in which the shaft slit is formed. The fastener 58 has slit portions 70 and 71 for diameter reduction of the shaft and tightens the input shaft 12 from the radial outside by tightening a bolt 72, thereby reducing the diameter of the input shaft 12. In the embodiment, tightening is performed in a state where the slit portions 70 and 71 of the fastener 58 are placed in positions P2 and P3 at substantially 90° to a position P1 where the shaft groove 62 for serving as both the keyway and the shaft slit is placed.

Figure 1:
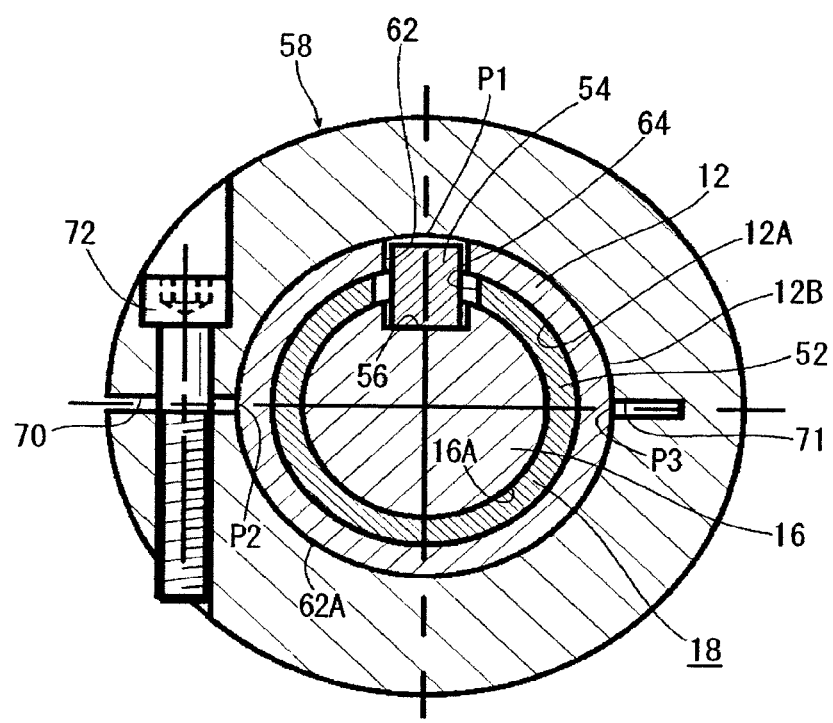
FIG. 1 illustrates a main part of a shaft coupling structure according to an exemplary embodiment of the present invention, and is an enlarged cross-sectional view taken along line I-I in FIG. 2.

The bush 52 has an axial length L1 (axial length of the bush slit 64) longer than an axial length L2 of the fastener (refer to FIG. 1).

Subsequently, with reference to FIGS. 3A and 3B, a magnitude relation between each part in the embodiment will be described.

Herein, signs are defined as follows.

Bf1: the width of the bush slit 64 of the bush 52 in a free state (before clamping is performed)

Bc1: the width of the bush slit 64 of the bush 52 after clamping is completed

Sf1: the width of the shaft groove 62 (=the keyway=the shaft slit) of the input shaft 12 in a free state.

Sc1: the width of the shaft groove 62 (=the keyway=the shaft slit) of the input shaft 12 after clamping is completed K1: the width of a key M1: the width of the keyway 56 of the motor shaft 16

Since the shaft groove 62 of the input shaft 12 becomes small due to diameter reduction of the input shaft 12 after clamping is completed compared to in a free state (before clamping), the width Sc1 is smaller than the width Sf1 where Sc1 is the width of the shaft groove 62 after clamping is completed and Sf1 is the width of the shaft groove 62 in a free state (Sc1<Sf1). Similarly, the width Bc1 is smaller than the width Bf1 where Bc1 is the width of the bush slit 64 after clamping is completed and Bf1 is the width of the bush slit 64 in a free state (Bc1<Bf1).

In the embodiment, after clamp coupling is completed, the bush slit 64 of the bush 52 has the width Bc1 larger than the width Sc1 of the keyway of the input shaft 12 (Bc1>Sc1).

In addition, even after clamp coupling is completed, the keyway of the input shaft 12 has the width Sc1 larger than the width K1 of the key 54 (Sc1>K1).

Furthermore, the width Bc1 is larger than the width Sf1 where Bc1 is the width of the bush slit 64 after clamping is completed and Sf1 is the width of the shaft groove 62 of the input shaft 12 in a free state (Bc1>Sf1).

Figure 3A:
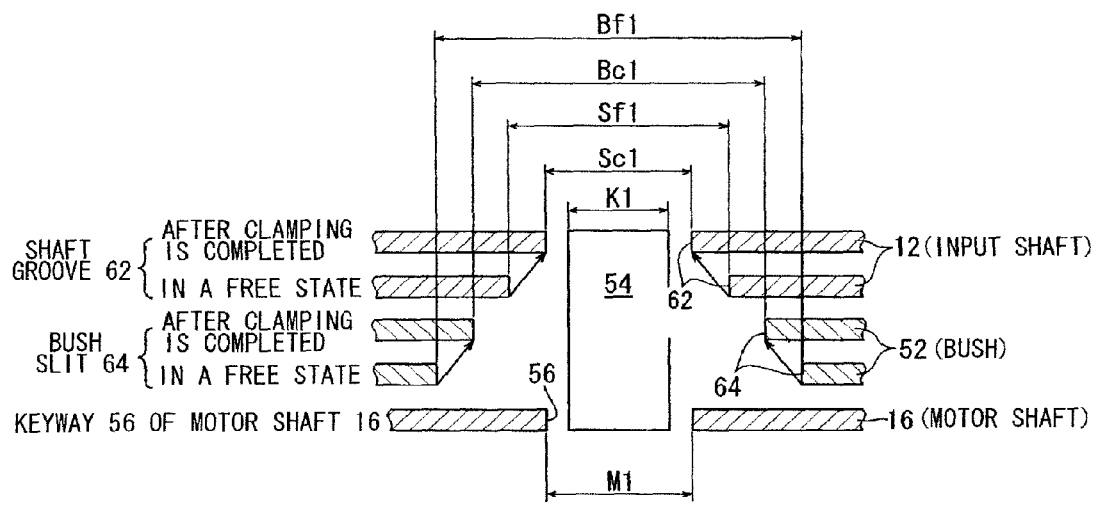
FIGS. 3A and 3B illustrate a magnitude relation between various elements of the embodiment in operation.

Consequently, as can be visually recognized from FIG. 3A, a relation of Bf1>Bc1>Sf1>Sc1>K1 is established.

In the embodiment, after clamping is completed, the shaft groove 62 is set to have the width Sc1 identical with the width M1 of the keyway 56 of the motor shaft 16 (Sc1≅M1). However, after the clamping is completed, the shaft groove 62 is not necessarily required to have the width Sc1 identical with the width M1 of the keyway 56 of the motor shaft 16, for example, may be set to have a width larger than the width M1 of the keyway 56 of the motor shaft 16.

Subsequently, an operation of the shaft coupling structure will be described.

In the shaft coupling structure according to the embodiment, the bush 52 and the key 54 are interposed between the inner circumference 12A of the input shaft 12 and the outer circumference 16A of the motor shaft 16. The bush 52 and the key 54 are pre-assembled onto any of the input shaft 12 and the motor shaft 16, and, in the pre-assembled state, the motor shaft 16 is fitted into the hollow portion 18 of the input shaft 12.

For example, first, the position (the position P1 in FIG. 1) of the bush slit 64 of the bush 52 is aligned with the shaft groove 62 (as the keyway) of the input shaft 12 and then the bush 52 is assembled onto the inner circumference 12A of the input shaft 12. In this state, the key 54 is assembled into the keyway 56 of the motor shaft 16, the position of the key 54 is aligned with the position P1 of the shaft groove 62 of the input shaft 12, and then the motor shaft 16 together with the key 54 is inserted into the hollow Portion 18 of the input shaft 12.

The fastener 58 is mounted on a portion of the outer circumference of the input shaft 12 in which the shaft groove (as the shaft slit) is formed, and the input shaft 12 is tightened by screwing the bolt 72 of the fastener 58 (diameter reduction).

At this time, the shaft groove 62 of the input shaft 12 has a width reduced from Sf1 to Sc1, but, since the shaft groove 62 is set to have the width Sc1 larger than the width K1 of the key 54 even after clamp coupling is completed (in a free state as well), there is no possibility that the shaft groove 62 of the input shaft 12 comes into contact with the key 54 in the middle of clamping being performed, thereby inhibiting the diameter of the input shaft 12 from being further reduced.

In addition, since the bush slit 64 of the bush 52 always has the width Bc1 larger than the width Sc1 of the shaft groove 62 after clamping is completed, there is also no possibility that the bush slit 64 of the bush 52 comes into contact with the key 54 while the shaft groove 62 of the input shaft 12 is reduced in diameter, and thus the diameter of the input shaft 12 cannot be further smoothly reduced.

That is, regardless of the bush 52 being interposed between the input shaft 12 and the motor shaft 16, diameter reduction of the input shaft 12 can be reliably performed by the fastener 58 without being affected by the existence of the key 54 and the existence of the bush 52.

As is apparent from the operation of the coupling described above, in the embodiment, gaps exist between the key 54 and the keyway and between the key 54 and the bush slit even after clamping is completed. Accordingly, power transmission is performed relying on the clamp coupling. Specifically, the power transmission is performed by frictional tightening force between the outer circumference 16A of the motor shaft 16 and the inner circumference of the bush 52, and by frictional tightening force between the outer circumference of the bush 52 and the inner circumference 12A of the input shaft 12. The key 54 does not contribute to the power transmission between the motor shaft 16 and the input shaft 12 (during a normal operation).

In this respect, for example, the embodiment greatly differs in the technical ideas of the coupling from a structure with a combination of the key and the clamping in the related art described above. That is, in the shaft coupling structure of the related art, "power transmission is basically performed via the key, and the clamping bridges a gap between the key and the keyway, thereby preventing vibration and noise from occurring", and the key takes the role of the power transmission. However, when this configuration is applied to a configuration where the bush is interposed between the motor shaft and the input shaft, the diameter reductions of the input shaft and the bush are not only prone to interfere with each other via the key while diameter reduction is performed, but also (since the bush exists between the keyway of the motor shaft and the keyway of the input shaft) gaps in any of the keyways are prone to be incompletely bridged and to remain. That is, the structure according to the related art described above is not basically prone to be applied to the structure with the bush being interposed.

In contrast, even in a free state or even when clamping is performed or even after clamping is completed, the embodiment is configured in such a manner that there are basically no interferences between the key 54 and the shaft groove 62 and between the key 54 and the bush slit 64, and thus the clamping (diameter reduction) of the input shaft 12 can be smoothly performed even with the bush 52 being interposed. In addition, since power transmission is performed basically relying on the clamp coupling, the merits of the clamp coupling such as the non-existence of backlash, small vibration and noise can be fully enjoyed.

In addition, even in case frictional transmission force is lost due to unknown causes, a coupling by the key 54 serves as backup, thereby preventing a driven machine coupled with the drive member from unexpectedly behaving.

In such a configuration where the key coupling and the clamp coupling are combined, the configuration can be applied to a coupling between various types of shafts at low costs only by suitably designing the bush. More specifically, when a coupling between the input shaft 12 (the first shaft) of the speed reducer 10 and the motor shaft 16 (the second shaft) is described as an example, the motor shaft 16 may have a diameter of various sizes, but one type of the input shaft 12 can handle the motor shaft 16 with a diameter of such various sizes by preparing a plurality of types of the bush 52 with an inner diameter corresponding to the diameter of the motor shaft 16. In addition, as the motor shaft may have a cylindrical shape, the motor shaft may have a taper shape. Even in such a case, the input shaft 12 with a cylindrical hollow portion can handle the motor shaft of any shape by preparing the bush with a tapered inner circumference.

Subsequently, a second embodiment of the present invention will be described. The same reference numerals and signs will be assigned to the same or similar portions to the first embodiment.

Figure 4:
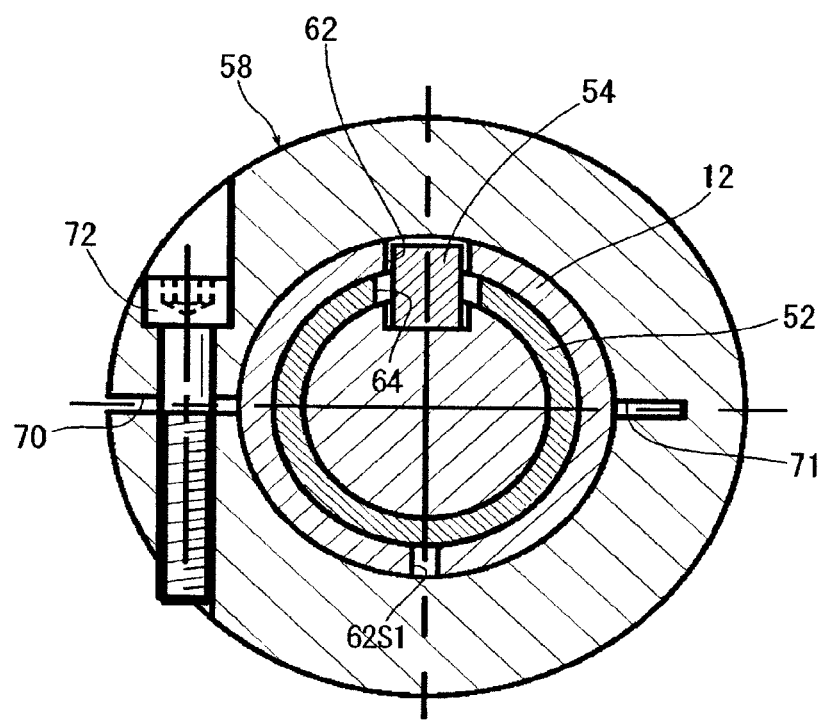
FIG. 4 is an enlarged cross-sectional view equivalent to FIG. 1 according to another exemplary embodiment of the present invention.

FIG. 4 illustrates an example in which a shaft slit 62S1 is added to the input shaft 12 (the first shaft) and, as a result, a plurality of the shaft slits (2 pieces) are formed in conjunction with the same shaft slit (also serving as a keyway) as in the first embodiment. The additional shaft slit 62S1 is formed at a position opposite to the shaft slit (180° opposite position) which also serves as a keyway.

However, in the embodiment, regardless of the plurality of shaft slits and 62S1 being formed in the input shaft 12, the bush 52 does not have a plurality of the bush slits 64 but has the only one bush slit 64 where the bush slit 64 also serves as the same shaft slit as in the first embodiment.

An intention of the configuration is as follows. That is, when the plurality of shaft slits and 62S1 are formed in the input shaft 12, a merit is obtained that the uniform diameter reduction of the input shaft 12 is much easily achieved compared to when only one shaft slit is formed. Accordingly, an off-center between the input shaft 12 and the shaft groove 62 can be suppressed, and stress concentration in the vicinity of the shaft groove 62 can be mitigated. In addition, the shaft slits and 62S1 formed in the input shaft (the first shaft) can be relatively easily processed by chucking a portion of the input shaft 12 on a side opposite to the motor side in the axial direction. On the other hand, when the plurality of bush slits are formed in the bush 52, the bush is not prone to be chucked in many cases when processing is performed, and thus the bush slits are not necessarily formed (processing) easily. In addition, since the bush 52 receives diameter reduction force from the fastener 58 via the input shaft 12, the uniform diameter reduction force of the input shaft 12 basically enables relatively uniform diameter reduction of the bush 52. Accordingly, when a configuration is made in such a manner that the input shaft 12 (the first shaft) has the shaft slits and 62S1 and the bush 52 has the only one bush slit 64, it can be said that the configuration has realistic processability and uniform clamping compatible with each other.

The input shaft 12 may have three or more shaft slits (as far as strength necessary for power transmission is ensured). Qualitatively, the more shaft slits the input shaft 12 has, the more uniformly the diameter thereof can be reduced.

In addition, in the example of FIG. 4, similar to the first embodiment, one shaft groove 62 for serving both as the keyway and the shaft slit is formed and one shaft slit 62S 1 (not serving as a keyway) with a width smaller than the keyway is additionally formed, but, for example, in FIG. 4, the additional shaft slit may be also formed to have such a width (the width Sf1 in a free state and the width Sc1 after clamping is completed) that the additional shaft slit can also serve as the same keyway as the shaft groove 62. In this case, since the shaft slits can be continuously processed using the same tool, manufacturing is much easily facilitated.

Figure 5A:
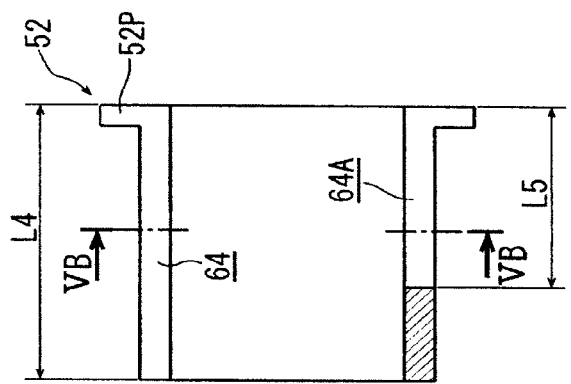
FIG. 5A illustrates a cross-sectional view of a bush taken along a line parallel to the axis and FIG. 5B illustrates a cross-sectional view of the bush viewed along arrows VB-VB in FIG. 5A according to still another exemplary embodiment of the present invention.
Figure 5B:
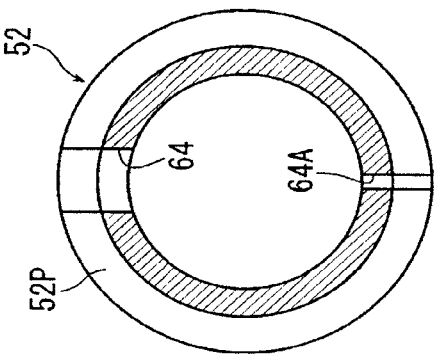

FIG. 5 illustrates a modification example of the bush.

As described above, due to challenging chucking or the like, it is not necessarily easy in practicality that the bush slit is formed in the bush to pass therethrough in the axial direction or the plurality of bush slits of a long length are formed in the bush.

In the bush 52 illustrated in FIG. 5, a plurality of the bush slit 64 and a bush slit 64A have axial lengths L4 and L5 changed, respectively. That is, since the bush slit 64 passes through the bush 52 in the axial direction, the bush slit 64 has the axial length L4 identical with the axial length L1 of the bush 52. However, the bush slit 64A does not pass through the bush 52 in the axial direction, and the bush slit 64A has the axial length L5 smaller than the axial length L4 of the bush slit 64 (L4>L5).

Accordingly, since rigidity of the bush 52 necessary for the chucking thereof can be ensured when processing is performed, easy processability and uniform clamping that are compatible with each other can be achieved.

In the bush 52 according to the embodiment, when the bush slit 64 passes through the bush 52 and is a long one, the bush slit 64 becomes a wide bush slit with which the key 54 (not illustrated in FIG. 5) can engage, and when the bush slit 64 does not pass through the bush 52 and is a short one, the bush slit 64 becomes a slender bush slit with which the key 54 cannot engage. However, similar to the modification example, the additional bush slit may also become a wide bush slit with which the key 54 can engage. The bush may have three or more bush slits.

As such, in the plurality of bush slits, even when there is a bush slit which does not pass through, the bush slit preferably has an axial length (L5 in this case) longer than the axial length L2 of the fastener 58 (not illustrated in FIG. 5 and refer to FIG. 2). Accordingly, partial contact of the fastener 58 can be prevented when clamping is performed.

Herein, with reference to FIGS. 3A and 3B again, a description of a magnitude relation between the widths of a bush slit, a keyway and a key will be supplemented.

As described above, in FIG. 3A, after clamping is completed, the bush slit 64 is set to have the width Bc1 larger than the width Sf1 of the shaft groove 62 of the input shaft in a free state (Bc1>Sf1). However, for example, the magnitude relation is not necessarily required as illustrated in FIG. 3B, in conclusion, when a relation is maintained "that, after the clamp coupling is completed, the bush slit 64 has a width Bc2 larger than a width Sc2 of the keyway of the input shaft 12", there is hardly any concerns in practicality. That is, for example, even though the bush slit 64 in a free state has a width Bf2 smaller than a width Sf2 of the keyway in a free state, there is no concerns as far as the bush slit 64 after the clamping is completed has the width Bc2 larger than the width Sc2 of the keyway after the clamping is completed.

Figure 3B:
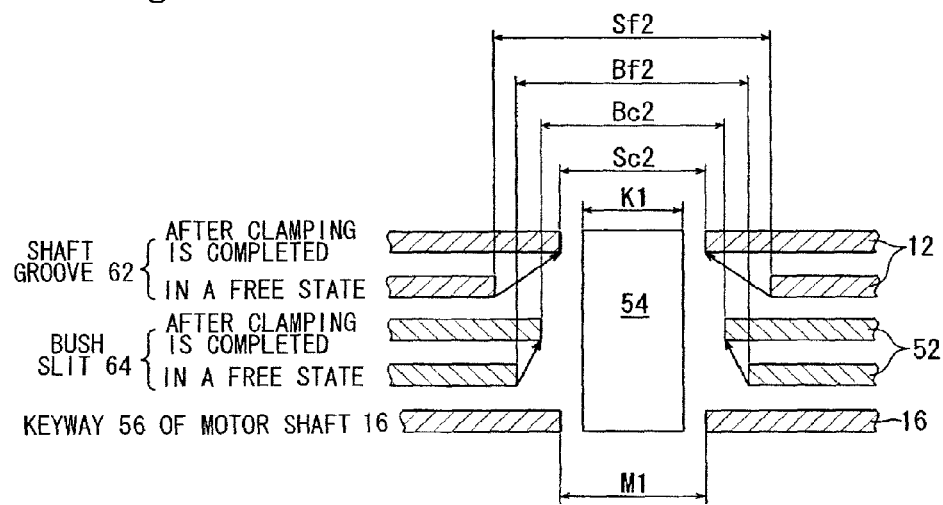

In any of FIGS. 3A and 3B, it is required to maintain a configuration that, even after the clamping is completed, the keyway of the input shaft 12 has the width Sc1 or Sc2 larger than the width K1 of the key 54 (Sc1>K1 or Sc2>K1) and thus the clamping is reliably performed all the way through the operation.

However, in certain embodiments of the present invention, a reversal of the magnitude relation (Sc1>K1 or Sc2>K1) is not completely prohibited. That is, after clamping is completed, the keyway of the input shaft 12 may be designed to have the width Sc1 smaller than the width K1 of the key 54 (Sc1<K1). In this case, the clamping by the fastener 58 serves to remove a gap between the key 54 and the keyway. Accordingly, power transmission involving power transmission by the key 54 can be achieved. Even in this case, when frictional tightening force itself by the fastener 58 is perfectly maintained and the power transmission is designed to be persistently performed on the basis of clamping force, the appropriate setting of the dimensions of each member can be simply controlled. In addition, after clamping is completed, the keyway may have the width Sc1 (Sc2) identical with the width Bc1 of the bush slit or may have Sc1 (Sc2)<Bc1.

In the embodiments described above, the slit of the input shaft serves as the keyway of the input shaft, but, in certain embodiments of the present invention, the shaft slit is not necessarily required to serve as the keyway. For example, a groove serving only as a keyway may be individually formed in a circumferential position different from a circumferential position where a slit serving only as a slit is formed, otherwise the keyway may be formed at the same circumferential position and the slit may be formed outside the circumference of the keyway to have a width smaller than the keyway.

In addition, in the embodiments described above, certain embodiments of the present invention is applied to a coupling between a motor shaft and an input shaft of a speed reducer, but are not limited to the coupling between the motor shaft and the input shaft of the speed reducer. Certainly, a configuration of the speed reducer is not limited to the configuration described above. For example, in an eccentric oscillation-type speed reducer having a plurality of eccentric body shafts (having an eccentric body) at positions offset from a shaft center of an internal gear or called a distribution type, for example, certain embodiments of the present invention can be applied to a portion where the input shaft of the speed reducer is coupled with a motor. In addition, certain embodiments of the present invention is not exactly limited to the speed reducer, in conclusion, can be widely applied to a shaft coupling structure where a second shaft is inserted into a cylindrical portion provided in a first shaft to be coupled with each other.

It should be understood that the invention is not limited to the above-described embodiment, but may be modified into various forms on the basis of the spirit of the invention. Additionally, the modifications are included in the scope of the invention.

What is claimed is:

1. A shaft coupling structure in which a second shaft is inserted into a cylindrical portion provided in a first shaft to be coupled with each other, wherein, with a bush being interposed between an inner circumference of the first shaft and an outer circumference of the second shaft, the first shaft and the second shaft are coupled with each other by a combination of a key coupling and a clamp coupling, wherein the first shaft has a keyway for the key coupling which a key engages and a shaft slit which is formed in the cylindrical portion by cutting off a portion thereof in an axial direction, wherein a fastener for the clamp coupling is mounted on a portion of an outer circumference of the first shaft in which the shaft slit is formed, wherein the bush has a bush slit which corresponds to the keyway, and wherein, after the clamp coupling is completed, the bush slit of the bush has a width larger than a width of the keyway of the first shaft.

2. The shaft coupling structure according to claim 1, wherein a single groove serves both as the first keyway of the first shaft and the shaft slit.

3. The shaft coupling structure according to claim 1, wherein, even after the clamp coupling is completed, the keyway of the first shaft has a width larger than a width of the key.

4. The shaft coupling structure according to claim 1, wherein the first shaft has a plurality of the shaft slits, and the bush has only one bush slit.

5. The shaft coupling structure according to claim 1, wherein the bush has a plurality of the bush slits, and at least two bush slits have axial lengths different from each other.

6. The shaft coupling structure according to claim 5, wherein, among the plurality of bush slits, one bush slit is formed to pass through the bush in the axial direction.

7. The shaft coupling structure according to claim 1, wherein the second shaft has a second keyway with which the key engages, and wherein the key engages with the keyway of the shaft and the second keyway of the second shaft.

8. The shaft coupling structure according to claim 1, wherein the first shaft, with different sizes of the bush, is configured to accommodate different sizes of the second shaft.

9. A shaft coupling structure in which a second shaft is inserted into a cylindrical portion provided in a first shaft to be coupled with each other, wherein, with a bush being interposed between an inner circumference of the first shaft and an outer circumference of the second shaft, the first shaft and the second shaft are coupled with each other by a combination of a key coupling and a clamp coupling, wherein the first shaft has a keyway for the key coupling which a key engages and a shaft slit which is formed in the cylindrical portion by cutting off a portion thereof in an axial direction, wherein a fastener for the clamp coupling is mounted on a portion of an outer circumference of the first shaft in which the shaft slit is formed, wherein the bush has a bush slit which corresponds to the keyway, wherein the bush has a plurality of the bush slits, and at least two bush slits have axial lengths different from each other, wherein, among the plurality of bush slits, one bush slit is formed to pass through the bush in the axial direction, and wherein, among the plurality of bush slits, the bush slits which do not pass through the bush have axial lengths longer than an axial length of the fastener.

10. The shaft coupling structure according to claim 9, wherein a single groove serves both as the keyway of the first shaft and the shaft slit.

11. The shaft coupling structure according to claim 9, wherein, even after the clamp coupling is completed, the keyway of the first shaft has a width larger than a width of the key.

12. The shaft coupling structure according to claim 9, wherein the first shaft has a plurality of the shaft slits, and the bush has only one bush slit.

13. The shaft coupling structure according to claim 9, wherein the second shaft has a second keyway with which the key engages, and wherein the key engages with the keyway of the shaft and the second keyway of the second shaft.

14. The shaft coupling structure according to claim 9, wherein the first shaft, with different sizes of the bush, is configured to accommodate different sizes of the second shaft.

* * * * *